United States Patent [19]
Seki et al.

[11] Patent Number: 5,327,070
[45] Date of Patent: Jul. 5, 1994

[54] POWER SUPPLY CIRCUIT FOR DRIVING A LIGHT EMITTING ELEMENT

[75] Inventors: Yoichi Seki; Shinichi Endo; Hiroyuki Saito; Akira Ito; Michio Kawai, all of Tokyo, Japan

[73] Assignee: Seikosha Co., Ltd., Tokyo, Japan

[21] Appl. No.: 874,496

[22] Filed: Apr. 27, 1992

[30] Foreign Application Priority Data

Apr. 25, 1991 [JP] Japan ................. 3-095116

[51] Int. Cl.$^5$ .................. G03B 13/36; G05F 1/62
[52] U.S. Cl. .......................... 323/222; 323/224; 323/282; 354/402; 354/484; 359/698; 250/201.2; 250/201.4
[58] Field of Search ............... 323/281, 282, 288, 222, 323/224, 902; 354/418, 484, 400, 402, 403; 250/201.2, 201.4; 356/3, 4; 359/698

[56] References Cited

U.S. PATENT DOCUMENTS

| | | |
|---|---|---|
| 4,501,481 | 2/1985 | Kataoka et al. ............ 354/418 X |
| 4,542,974 | 9/1985 | Yoshikawa et al. ............ 354/415 |
| 4,569,580 | 2/1986 | Kataoka et al. ............ 354/484 X |
| 4,572,644 | 2/1986 | Kataoka et al. ............ 354/415 |
| 4,615,599 | 10/1986 | Kataoka et al. ............ 354/415 |
| 4,803,507 | 2/1989 | Akashi et al. ............ 354/403 X |
| 5,032,864 | 7/1991 | Ishimura et al. ............ 354/484 |

Primary Examiner—Emanuel T. Voeltz
Attorney, Agent, or Firm—Jordan and Hamburg

[57] ABSTRACT

In a step-up circuit for causing the emission of light of a distance measuring light emitting element, the step-up circuit outputs a step-up voltage from one terminal of a step-up capacitor. A step-up voltage level changeover circuit applies a step-up voltage to the capacitor every time the distance measuring light emitting element emits light that is higher than the step-up voltage in the normal state. The number of parts is reduced by eliminating a separate capacitor for light emission, the space for the circuit is reduced by using the capacitor having a small capacity, the soldering steps for fabrication of the circuit are automated; and the costs for assembly are ameliorated owing to the automation.

9 Claims, 4 Drawing Sheets

POWER SUPPLY CIRCUIT FOR DRIVING A LIGHT EMITTING ELEMENT

FIELD OF THE INVENTION

This invention relates to power supply circuits, and is more in particular directed to a power supply adapted to drive a light emitting element, for example in a distance measuring circuit of a camera.

BACKGROUND OF THE INVENTION

A conventional power supply circuit for driving a light emitting element, as illustrated in FIG. 4, is comprised of a step-up circuit 1, a step-up voltage control circuit 15, a voltage regulator 11, a CPU 13, an AF unit 12 and an AF light emitting diode 17 for emitting light in response to the operation of a light emitting diode driving transistor 16.

The step-up circuit 1 includes a coil 2, a rectifier diode 3, a switching transistor 4 and a step-up capacitor $C_1$. One terminal of the coil 2 is connected to the (+) terminal of a battery VB, and the (−) terminal of the battery VB is connected to a ground point. The other terminal of the coil 2 is connected to the anode of a rectifier diode 3, and the cathode of the rectifier diode is connected to a pin $P_1$. The other end of the coil 2 is also connected to the collector of a switching transistor 4. The emitter of the transistor is connected to the ground point, and the base of the switching transistor 4 is connected to a pin $P_2$. One electrode of a step-up capacitor $C_1$ is connected to the pin $P_1$, and e other electrode thereof is connected to the ground point.

An input terminal of the voltage regulator circuit 11 is connected to the pin $P_1$, while the output thereof provides a stabilized power supply voltage VDD. This voltage is applied to one electrode of a capacitor $C_2$. The other electrode of the capacitor $C_2$ is connected to the ground point. One electrode of a light emitting capacitor $C_3$ is connected to a junction point between resistors $R_4$ and $R_3$, and the other electrode of the capacitor $C_3$ is connected to the ground point. The other end of the resistor $R_4$ is connected to the pin $P_1$ of the step-up circuit 1 and the other end of the resistor $R_3$ is connected to the anode of the light emitting diode 17. The cathode of the AF light emitting diode 17 is connected to the ground point via the collector and emitter path of the light emitting diode driving transistor 16.

The step-up circuit 1 of the above described power supply circuit for driving the light emitting element employs known circuitry. The step-up capability of this circuit is determined by losses of the parts thereof and duty cycles of step-up clock signals applied to the switching transistor 4. The step-up voltage control circuit 15, which is comprised of a comparator or the like, performs the function of maintaining a constant step-up voltage by stopping the step-up operation when the step-up voltage increases over a predetermined voltage, and reducing the duty of the step-up clocks applied to a pin $P_6$ from the CPU 13 In this arrangement, the stepped up voltage is applied to the input of the voltage regulator 11. The regulated voltage VDD of approximately 5 V is applied from the output of the regulator to the CPU 13 and the AF unit 12. The light emitting diode driving transistor 16 for driving the AF light emitting diode 17 is turned ON/OFF in response to signals output from a pin $P_5$ of the AF unit 12. The resistor $R_3$ and the light emitting capacitor $C_3$ serve as a power supply circuit for the AF light emitting diode 17.

The AF light emitting diode 17 emits light with the energy from electric charges with which the light emitting capacitor $C_3$ is charged. The electric charges with which the light emitting capacitor $C_3$ is charged is supplied from the step-up capacitor $C_1$. If a large charge current flows in the light emitting capacitor $C_3$ in a charging cycle, the predetermined voltage is not applied to the input side of the voltage regulator 11, with the result that the prescribed regulated voltage VDD can not be maintained. The resistor $R_4$ is provided in order to avoid this problem. A surge current flowing in the light emitting capacitor $C_3$ is restrained by resistor $R_4$.

As described above, the conventional power supply circuit for driving the light emitting element requires a capacitor having a large capacity. A capacitor with a large capacity typically employs an aluminum electrolytic capacitor. If such a capacitor is packaged into a small-sized camera, the problem arises that the required space is not sufficient and the costs of the elements are increased.

Medium and large-sized capacitors, such as aluminum electrolytic capacitors, etc. are assembled manually, resulting in the disadvantage that the assembly costs are increased.

SUMMARY OF THE INVENTION

It is an object of the present invention, to provide a power supply circuit for driving a light emitting element which is capable of reducing the number of parts by eliminating a light emitting capacitor, reducing the space factor by using a capacitor having a small capacity, automating the soldering steps and ameliorating the costs for assembly due to automation by providing a step-up voltage level changeover circuit for applying a higher step-up voltage every time the distance measuring light emitting element connected to the step-up capacitor emits light than the step-up voltage in the normal state.

A power supply circuit for driving a light emitting element according to the present invention comprises a step-up circuit for outputting a step-up voltage from one terminal of a step-up capacitor, a step-up voltage level changeover means for changing over the step-up voltage level of the step-up capacitor to a second step-up voltage level higher than the first step-up voltage level, and a distance measuring light emitting element connected to receive the second step-up voltage at one terminal of the step-up capacitor that is changed over by the step-up voltage level changeover means.

When no step-up voltage changeover signal is applied to pin $P_3$ of the step-up voltage level changeover circuit 5 illustrated in FIG. 2, the reference voltage for determining the step-up level is changed over to the first reference voltage 1VR and first step-up level 1VS is selected. If the regulated voltage VDD is 5 V, for instance, the first step-up level 1 VS is approximately 5.5 V. When the step-up voltage changeover signal is applied to the pin $P_3$, the reference voltage for determining the step-up level is changed over to the second reference voltage 2VR, whereby the second step-up level 2VS is approximately 10 V. At this time, when the AF light emitting diode 17 emits light, as illustrated in FIG. 3, the step-up voltage of the step-up capacitor $C_1$ abruptly drops down in accordance with a light emitting signal from a point of time when the step-up voltage of the step-up capacitor $C_1$ has increased to approximately 10 V of the second step-up level 2VS. After stopping the emission of light, the step-up capacitor $C_1$ is quickly recharged. The charge and discharge are repeated every time the AF light emitting diode 17 emits light.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

One embodiment of a power supply circuit for driving a light emitting element, according to the present invention, will now be described in detail with reference to FIGS. 1-3.

Figure 1:
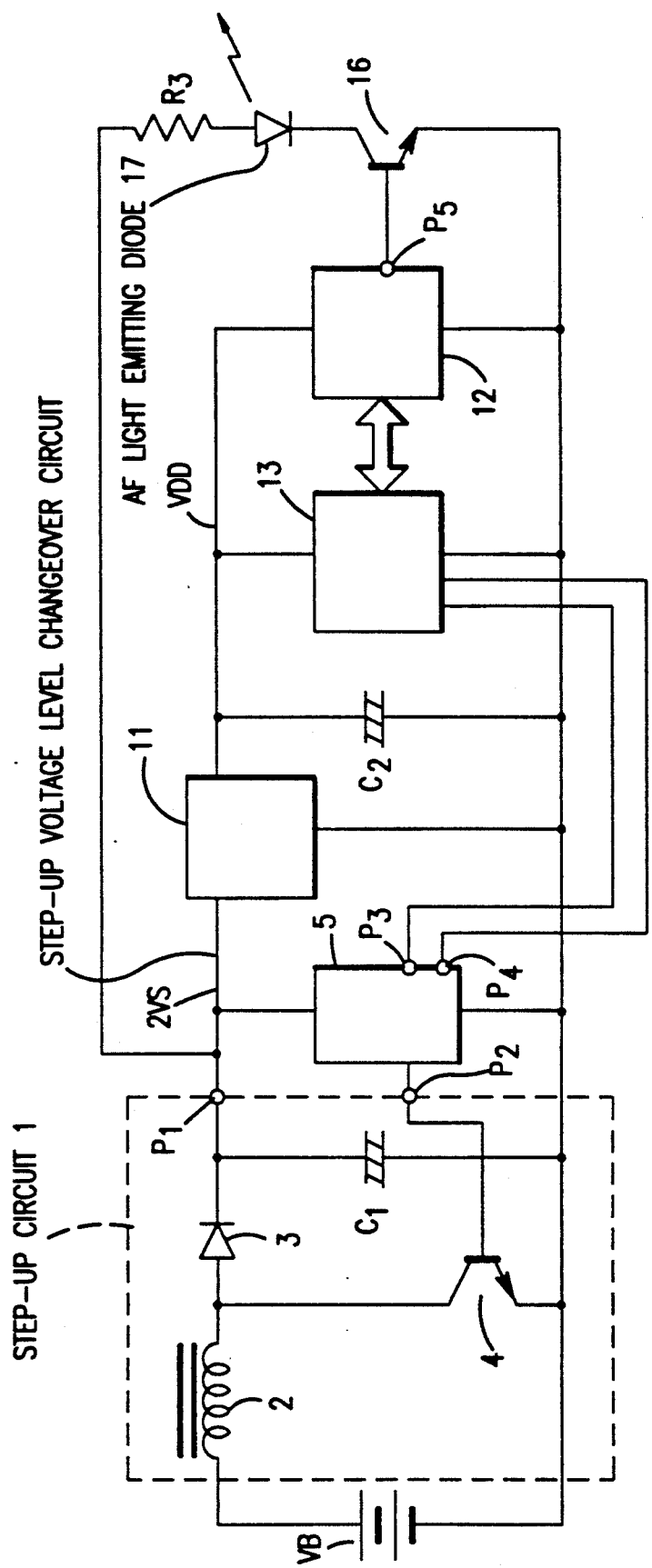
FIG. 1 is a block diagram showing one embodiment of a power supply circuit for driving a light emitting element according to the present invention.
Figure 4:
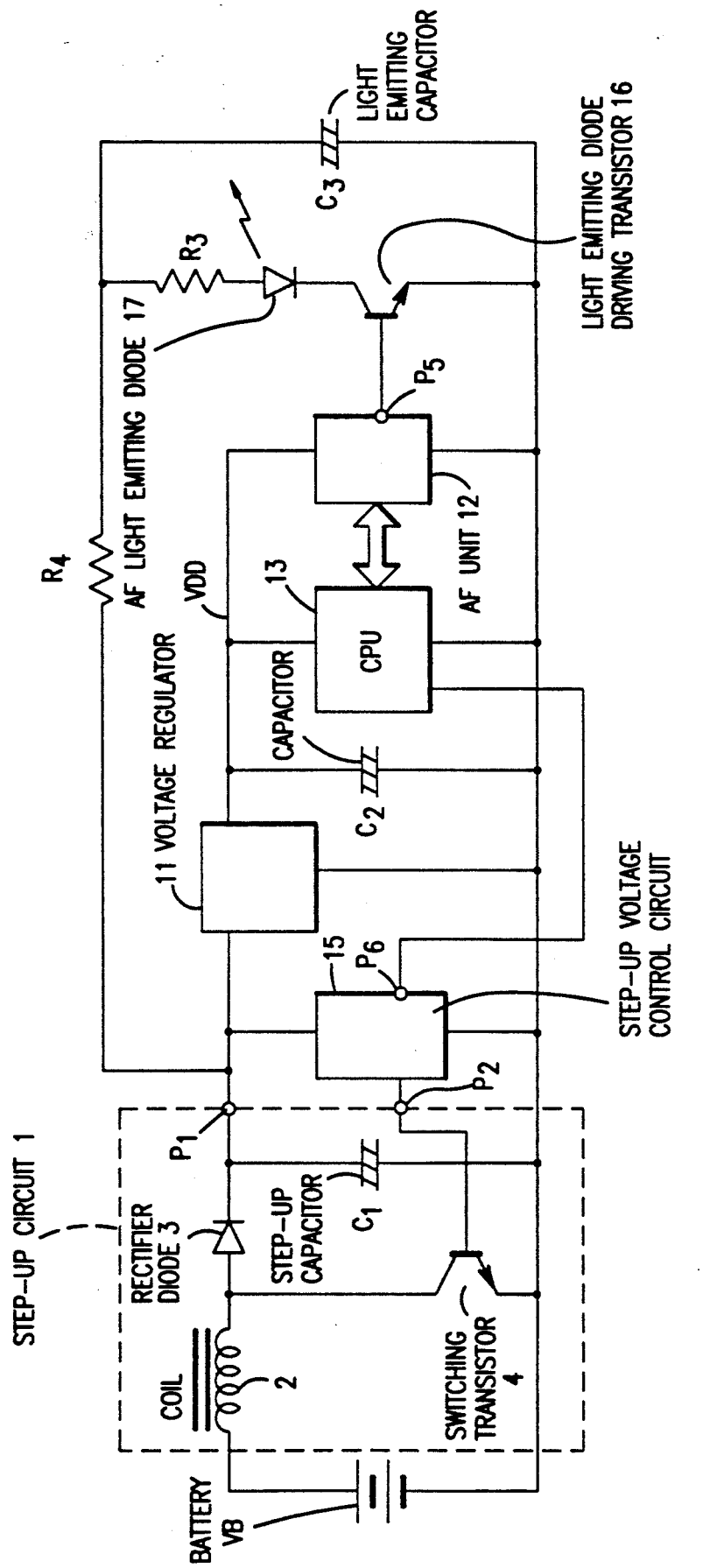
FIG. 4 is a block diagram illustrating a conventional power supply circuit for driving a light emitting element.

Components of FIG. 1 that correspond to those of FIG. 4 are marked with the same symbols, and hence the description thereof will be omitted.

The power supply circuit for driving the light emitting element, as illustrated in FIG. 1, is comprised of a step-up circuit 1, a step-up voltage control circuit 5, a voltage regulator 11, a CPU 13, an AF unit 12 and an AF light emitting diode 17 for emitting the light in response to the operation of a light emitting diode driving transistor 16.

The step-up circuit 1 includes a coil 2, a rectifier diode 3, a switching transistor 4 and a step-up capacitor $C_1$. One end of the coil 2 is connected to the (+) terminal of a battery VB, and the (−) terminal of the battery is connected to a ground point. The other end of the coil 2 is connected to the anode of a rectifier diode 3 as well as to the collector of a switching transistor 4. The cathode of the rectifier diode is connected to a pin $P_1$, which outputs a stepped up voltage. The emitter of the transistor is connected to the ground point. The base of the switching transistor 4 is connected to a pin $P_2$. One electrode of a step-up capacitor $C_1$ is connected to the pin $P_1$ and the other electrode thereof is connected to the ground point.

The input of the voltage regulator 11 is connected to the pin $P_1$ which receives the stepped up voltage. The output of the voltage regulator 11 is connected to an AF unit 12 and a CPU 13, to supply the regulated voltage VDD thereto. The output of the voltage regulator is also connected to one electrode of a capacitor $C_2$, and the other electrode of the capacitor $C_2$ is connected to the ground point.

The anode of the AF light emitting diode 17 is connected via a resistor $R_3$ to the pin $P_1$ of the step-up circuit 1, and the cathode thereof is connected to the collector of the light emitting diode driving transistor 16. The emitter of the light emitting diode driving transistor 16 is connected to the ground point.

Figure 2:
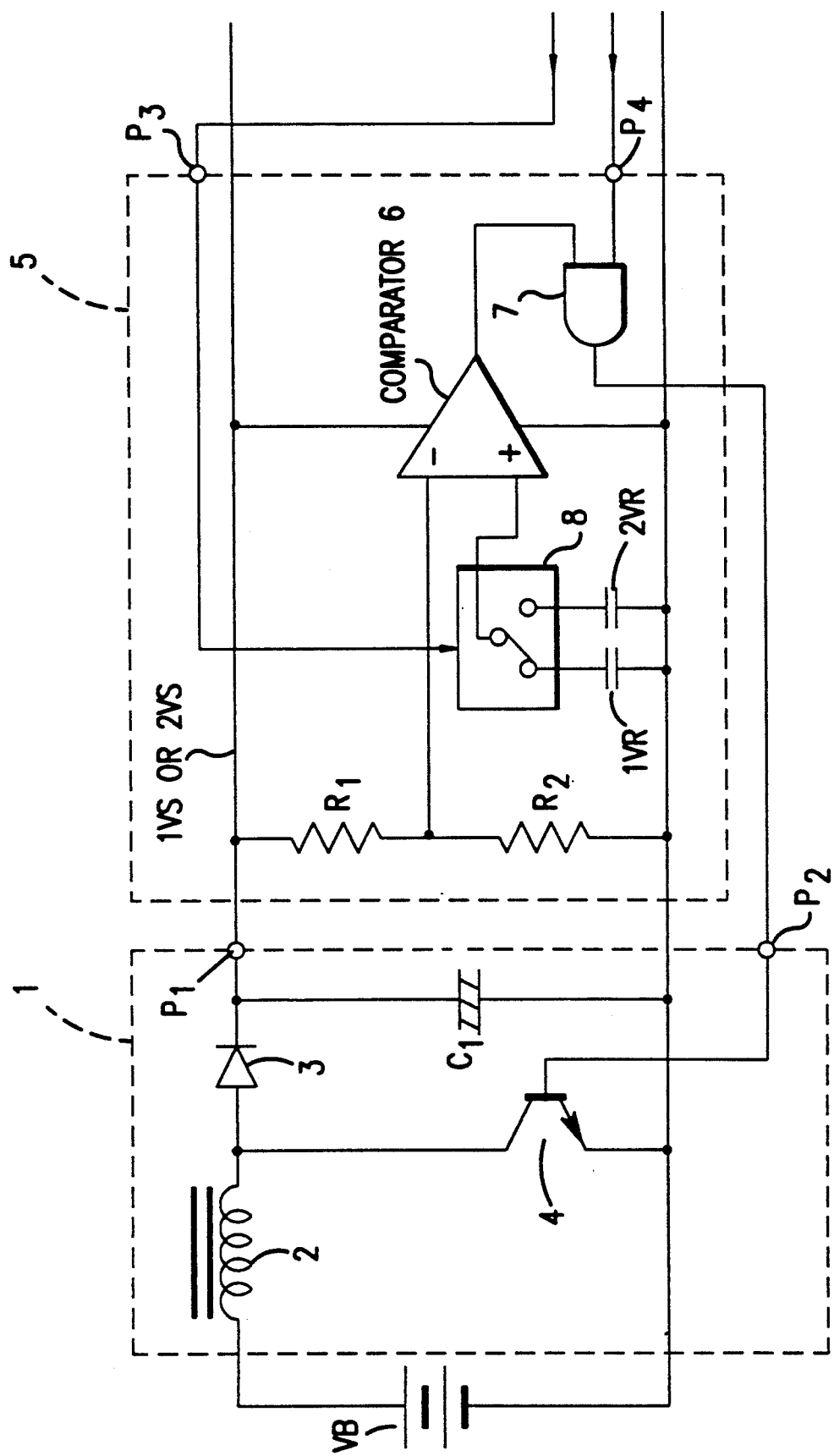
FIG. 2 is a block diagram illustrating a step-up voltage level changeover circuit used for the power supply circuit of FIG. 1.
Figure 3:
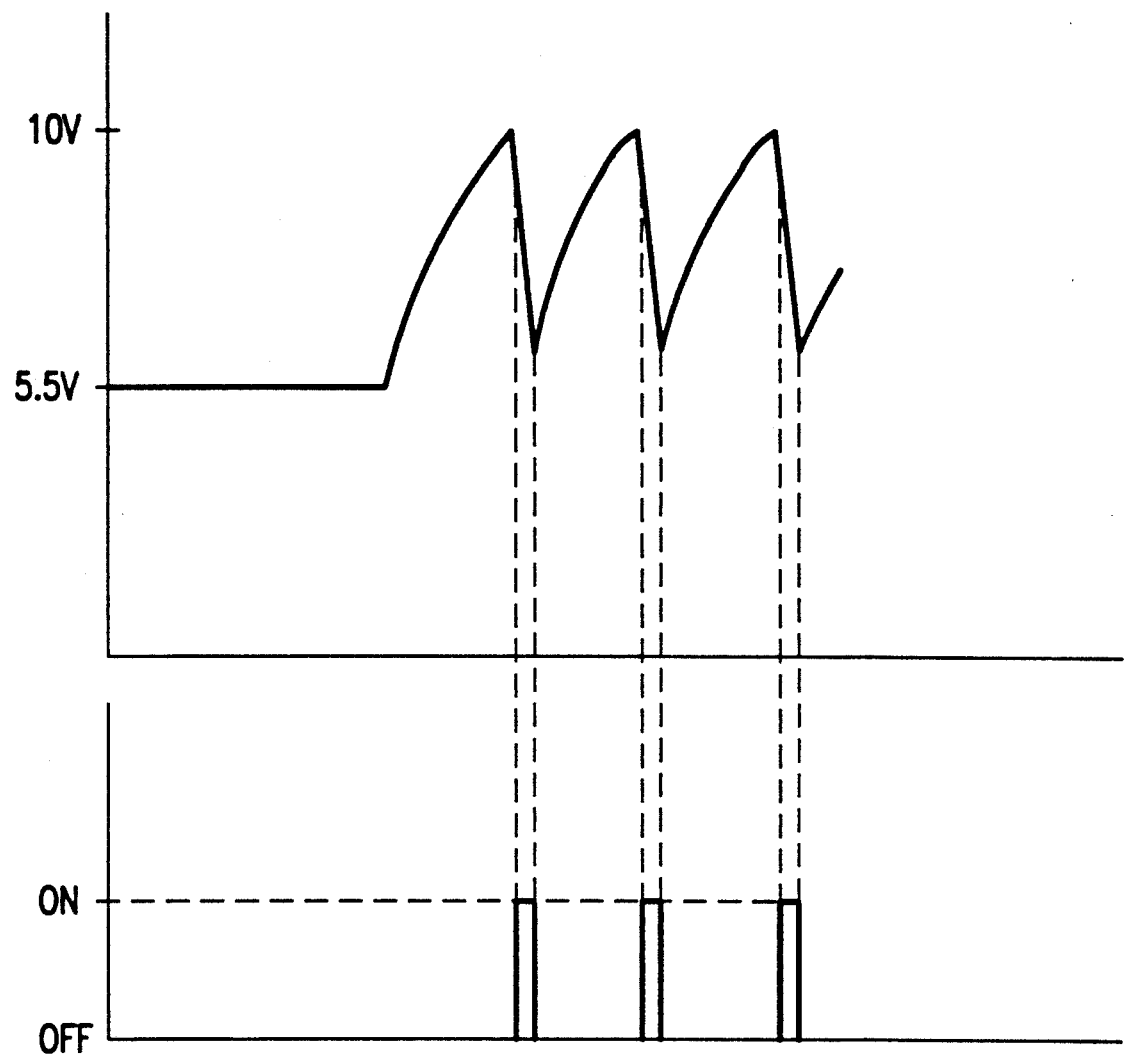
FIG. 3 is a diagram illustrating a waveforms of the power supply circuit of FIG. 1.

The step-up voltage changeover circuit 5 is, as shown in FIG. 2, comprised of a comparator 6, an AND circuit 7 and a reference voltage changeover element 8 having a changeover contact. The inverting (−) input terminal of the comparator 6 is connected to the junction point between the resistors $R_1$ and $R_2$, these resistors being connected in series between the pin $P_1$ and the ground point. The non-inverting (+) input of the comparator 6 is connected to the changeover contact of the reference voltage changeover element 8. The normally-closed and normally-open contacts of the reference voltage changeover element 8 are connected respectively to the (+) terminals of first and second reference voltage sources 1VR, 2VR, and the (−) terminals of these sources are connected to the ground point.

The output of the comparator 6 is connected to one input of the AND circuit 7 the other input of the AND circuit is connected to a pin $P_4$. The output of the AND circuit 7 is connected to the pin $P_2$ of the step-up circuit 1. The pins $P_3$, $P_4$ are also connected to the CPU 13. A step-up voltage change-over signal for operating the reference voltage changeover element 8 is inputted to the pin $P_3$ from the CPU. Step-up clock signals are applied to the pin $P_4$ from the CPU 13.

In the thus described power supply circuit for driving the light emitting element, when no step-up voltage changeover signal is applied to the pin $P_3$ of the step-up voltage level changeover circuit 5 illustrated in FIG. 2, the reference voltage for determining the step-up level is set to the first reference voltage 1VR, thereby selecting a first step-up level 1VS. For instance, if the regulated voltage VDD is 5 V, this first step-up level 1VS is approximately 5.5 V. When the step-up voltage changeover signal is applied to the pin $P_3$, the reference voltage for determining the step-up level is changed over to the second reference voltage 2VR, so that the second step-up level 2VS becomes approximately 10 V. At this time, when the AF light emitting diode 17 emits light, as illustrated in FIG. 3, the step-up voltage of the step-up capacitor $C_1$ abruptly drops in accordance with the light emitting signal from the instant when the step-up voltage of the step-up capacitor $C_1$ has increased to approximately 10 V. After stopping the emission of light, the capacitor is quickly recharged with electricity. The charge and discharge are repeated every time the AF light emitting diode 17 emits light. During the light emission of the AF light emitting diode 17, the regulated voltage VDD supplied to the CPU 13 and the AF unit 12 from the voltage regulator 11 is kept decrease below 5.5 V of the first step-up level 1VS. The first step-up level 1VS is determined by the regulated voltage VDD as the power supply voltage and, with respect to the second step-up level 2VS, if the current flowing to the AF light emitting diode 17 and the time are set to 1A and 100–150 μS, respectively, it is sufficient that the capacitance of the step-up capacitor $C_1$ is 47–68 μF or thereabouts.

The reference voltage changeover circuit of the step-up voltage level changeover circuit 5 i the embodiment discussed above may employ a semiconductor element. Further, the switching transistor 4 and the light emitting diode driving transistor 16 may be comprised of an integrated MOSFETs or the like in combination with other circuits.

The power supply circuit for driving the light emitting element according to the present invention comprises a step-up circuit for outputting the step-up voltage from one terminal of the step-up capacitor, a step-up voltage level changeover means for changing over the step-up voltage level of the step-up capacitor to the second step-up voltage level higher than the first step-up voltage level, and a distance measuring light emitting element connected to the second step-up voltage terminal connected to one terminal of the step-up capacitor and changed over by the step-up voltage level changeover means. This arrangement has the advantages of reducing the number of parts by eliminating the need for a separate capacitor for energizing the light emitting diode, reducing the space by using a capacitor having a small capacity, automating the soldering steps and ameliorating the costs for assembly owing to the automation.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A power supply circuit for driving a light emitting element, comprising:
   a step-up capacitor having two terminals;
   a step-up circuit connected to said step-up capacitor to apply a step-up voltage of a first level thereto;
   a step-up voltage level changeover means connected to both of the terminals of said step-up capacitor for changing over the step-up voltage level applied to said step-up capacitor to a second step-up voltage level that is higher than the first step-up voltage level;
   a distance measuring light emitting element connected to both terminals of said step-up capacitor for selectively receiving the voltages of first and second step-up voltage applied thereto;
   an operating means generating a step-up voltage changeover signal which is the first step-up voltage when said distance measuring light emitting element does not emit and the second step-up voltage when said light emitting element emits; and
   a control means connected between said operating means and said step-up voltage changeover means, and communicating said step-up voltage to said changeover signal.

2. A power supply circuit for driving a light emitting element, comprising:
   a step-up capacitor having two terminals;
   a step-up circuit connected to both of the terminals of said step-up capacitor to apply a step-up voltage across said step-up capacitor;
   a step-up voltage level changeover means connected to control said step-up circuit to selectively generate a step-up voltage of a first level, and a step-up voltage of a second level, the step-up voltage corresponding to said second level being higher than the step-up voltage corresponding to said first level;
   a distance measuring light emitting element;
   means connecting said light emitting element to receive the voltage across said step-up capacitor;
   an operating means generating a step-up voltage changeover signal which is the first step-up voltage when said distance measuring light emitting element does not emit and is the second step-up voltage when said light emitting element emits; and
   a control means connected between said operating means and said step-up voltage changeover means, and communicating said step-up voltage to said changeover signal.

3. The power supply circuit of claim 2 wherein said changeover means comprises first and second reference supplies, select means for selecting one of said reference supplies, and voltage comparing means;
   said comparing means comprising means for outputting to said step-up circuit, the signal which is compared to the voltage across said step-up capacitor with one of the voltages of said first or second reference supplies which is selected by said selecting means, 4. The power supply circuit of claim 2 wherein said means connecting said light emitting element to receive the voltage across said step-up capacitor comprises switch means.

5. The power supply circuit of claim 4 further comprising a control circuit connected to control said switch means and step-up level changeover means.

6. A power supply circuit for driving a light emitting element, comprising:
   a step-up capacitor having two terminals;
   a step-up circuit connected to said step-up capacitor to apply a step-up voltage thereto;
   a step-up voltage level changeover means connected to said step-up circuit for controlling said step-up to selectively apply step-up voltages of first and second levels to said step-up capacitor;
   a distance measuring light emitting element, and means connecting said light emitting element to the terminals of said step-up capacitor to receive voltages applied to said step-up capacitor;
   an operating means generating a first step-up voltage changeover signal when said distance measuring light emitting element does not emit and second step-up voltage changeover signal when said light emitting element emits; and
   means connected to apply said first an second step-up voltage changeover signals to said step-up voltage level changeover means;
   said step-up voltage level changeover means being responsive to receipt of said first step-up voltage changeover signal for controlling said step-up circuit to apply said voltage of said first level to said step-up capacitor, and means responsive to receipt of said second step-up voltage changeover signal for controlling said step-up circuit to apply said voltage of said second level to said step-up capacitor.

7. The power supply circuit of claim 6 wherein said step-up changeover means comprises first and second reference voltage source, means for selectively comparing said first and second reference voltages with the voltage across said step-up capacitor, and means for controlling said step-up circuit to selectively charge said step-up capacitor to said voltages of said first and second levels, respectively, thereto.

8. The power supply means of claim 7 wherein said means for selectively comparing comprises a changeover switch, and means responsive to said first and second step-up voltage changeover signals for selectively comparing said first and second reference voltages with said voltage across said step-up capacitor.

9. The power supply means of claim 6 wherein said operating means comprises a CPU, said CPU is further connected to selectively control said means connecting said light emitting element to the terminals of said step-up capacitor to permit current from said step-up capacitor to flow through said distance measuring light emitting element.

* * * * *